(12) United States Patent
Kienzle et al.

(10) Patent No.: US 7,767,733 B2
(45) Date of Patent: Aug. 3, 2010

(54) CLUTCH LININGS COMPRISING FIBER-REINFORCED CERAMIC MATERIALS

(75) Inventors: Andreas Kienzle, Möttingen Ot Balgheim (DE); Mario Krupka, Adelsried (DE); Gustavo Cabello, Augsburg (DE); Ronald Hüner, Baar (DE); Moritz Bauer, Augsburg (DE)

(73) Assignee: SGL Carbon AG (DE)

( * ) Notice: Subject to any disclaimer, the term of this patent is extended or adjusted under 35 U.S.C. 154(b) by 577 days.

(21) Appl. No.: 10/919,960

(22) Filed: Aug. 17, 2004

(65) Prior Publication Data

US 2005/0043433 A1 Feb. 24, 2005

(30) Foreign Application Priority Data

Aug. 20, 2003 (DE) ................. 103 38 200

(51) Int. Cl.
*C08J 5/14* (2006.01)
*C03C 13/00* (2006.01)
*C04B 35/00* (2006.01)

(52) U.S. Cl. .................. 523/149; 523/150; 523/156; 501/35; 501/95.1

(58) Field of Classification Search ........ 523/149, 523/150, 156; 428/292.1, 294.1, 408, 698, 428/704, 426; 18/218, 250; 501/95.1, 35
See application file for complete search history.

(56) References Cited

U.S. PATENT DOCUMENTS

| | | | |
|---|---|---|---|
| 3,967,037 A * | 6/1976 | Marzocchi et al. ........ 428/392 |
| 4,381,716 A * | 5/1983 | Hastings et al. ............ 109/2 |
| 4,582,553 A | 4/1986 | Buchta |
| 5,433,774 A | 7/1995 | Kapl et al. |
| 6,030,913 A | 2/2000 | Heine et al. |
| 6,110,268 A * | 8/2000 | Gross et al. ............... 106/36 |
| 6,231,791 B1 | 5/2001 | Heine et al. |
| 6,261,981 B1 | 7/2001 | Dietrich et al. |
| 6,316,086 B1 * | 11/2001 | Beier et al. ............ 428/293.4 |
| 6,451,872 B1 * | 9/2002 | Yamane ................... 523/156 |
| 6,514,592 B1 | 2/2003 | Hubbard et al. |
| 6,838,162 B1 | 1/2005 | Gruber et al. |
| 7,191,885 B2 * | 3/2007 | Kienzle et al. .......... 192/107 M |
| 7,261,846 B2 * | 8/2007 | Bauer et al. ............. 264/29.1 |
| 7,413,701 B2 * | 8/2008 | Kienzle et al. ............ 264/658 |
| 2003/0003286 A1 * | 1/2003 | Gruber et al. ........... 428/293.4 |
| 2003/0057040 A1 | 3/2003 | Bauer et al. |
| 2003/0106751 A1 * | 6/2003 | Bauer et al. ........... 188/218 XL |
| 2003/0129375 A1 | 7/2003 | Bauer et al. |
| 2003/0138672 A1 | 7/2003 | Bauer et al. |
| 2003/0168757 A1 | 9/2003 | Bauer et al. |
| 2004/0127600 A1 * | 7/2004 | Bauer et al. ............... 523/152 |
| 2005/0040003 A1 * | 2/2005 | Kienzle et al. .......... 192/107 M |

FOREIGN PATENT DOCUMENTS

| | | |
|---|---|---|
| DE | 197 10 105 | 9/1998 |
| DE | 19711829 C1 | 9/1998 |
| DE | 19944345 A1 | 3/2001 |
| DE | 101 57 583 | 12/2002 |
| DE | 101 64 627 | 2/2003 |
| DE | 101 64 229 | 7/2003 |
| DE | 101 64 231 | 7/2003 |
| EP | 0 866 923 | 9/1998 |
| EP | 1273818 A1 | 1/2003 |
| EP | 1319640 A2 | 6/2003 |
| EP | 1 521 009 A2 * | 8/2004 |
| WO | WO-9101621 A2 | 2/1991 |
| WO | WO 97/22815 * | 6/1997 |

* cited by examiner

*Primary Examiner*—Vasu Jagannathan
*Assistant Examiner*—Hannah Pak
(74) *Attorney, Agent, or Firm*—Connolly Bove Lodge & Hutz LLP

(57) ABSTRACT

Clutch lings comprising fiber-reinforced ceramic materials which comprise carbon fibers and whose matrix material is selected from among inorganic polymers, oxidic ceramics, set cements, organoelement polymers and finely divided inorganic solids which are held together by an inorganic or organic binders.

3 Claims, No Drawings

CLUTCH LININGS COMPRISING FIBER-REINFORCED CERAMIC MATERIALS

FIELD OF THE INVENTION

The invention relates to clutch linings comprising fiber-reinforced ceramic materials.

BACKGROUND OF THE INVENTION

Clutch systems are used in motor vehicles for separating the engine and gearbox. In modern vehicles, virtually exclusive use is made of friction clutches or hydrodynamic transmissions. In the customary friction clutch, force-transmitting connection between the shaft from the engine and the shaft entering the gearbox is established by means of one or more disks pressed against one another, with at least one clutch disk connected to the shaft entering the gearbox, which has linings on both sides, being located between the flywheel of the engine and a clutch pressure plate. When the clutch pedal is depressed, the pressure plate is pushed away from the clutch disk against the spring force of the disk spring, as a result of which the clutch disk is released. The connection between the engine and the gearbox is thereby interrupted.

The magnitude of the torque which can be transmitted depends on the area and the diameter of the clutch disk and on the spring force of the disk spring. For large torques, clutch systems having a relatively large friction area or multidisk clutches are therefore used. The clutch disk is, especially on starting, subject to wear by rubbing and is heated by the friction.

In view of this prior art, it is an object of the invention to provide clutch systems which can transmit large torques at small construction sizes. Single-disk systems which have relatively small friction areas are preferred for this purpose.

Friction pairings with ceramic materials, in particular fiber-reinforced ceramic materials, are known. When used as brake disks, high heat resistance and a coefficient of friction which has a low dependence on the load are required. In the case of clutch systems, high static friction and high torsional stiffness are desired.

In EP-A 0 866 923, a friction pairing for clutches is disclosed which comprises a network of carbon fibers, with silicon carbide being present in the filler. The silicon carbide is obtained by reaction of the free carbon present in the network which is not in fiber form with a silicon melt. The fiber network is always also attacked in this reaction unless recourse is made to particular measures for protecting the fibers, as described, for example, in DE-A 197 10 105, and these measures considerably increase the costs of producing the fibers protected in this way.

SUMMARY OF THE INVENTION

For this reason, linings for clutch disks which are simple to manufacture and display high static friction values are desirable.

The object of the invention is achieved by clutch linings comprising fiber-reinforced ceramic materials which comprise carbon fibers and whose matrix material is selected from among inorganic polymers, oxidic ceramics, set cements, organoelement polymers and finely divided inorganic solids which are held together by an inorganic or organic binder.

The term inorganic polymers is used to describe polymers whose main chains contain no carbon atoms but are made up of aluminum and/or boron, phosphorus, oxygen, sulfur, silicon, nitrogen and tin atoms. Particularly useful inorganic polymers are, for example, poly(boronitrides), polyphosphates, polyphosphazenes, poly(silanes), poly(siloxanes), poly(sulfazenes) and polysulfides which have a very good thermal stability.

DETAILED DESCRIPTION OF THE PREFERRED EMBODIMENTS

Suitable oxidic ceramics are, in particular, aluminum oxide, zirconium oxide and mixed oxides which further comprise, in addition to the oxides mentioned, silicon dioxide, boron oxide, magnesium oxide and titanium oxide.

Portland cement is particularly useful as matrix for clutch linings; it is also possible to use the standardized cement referred to as "blast furnace slag cement", which comprises portland cement with an addition of slag sand corresponding to a mass fraction of from 38% to 80%. The term "slag sand" refers to a siliceous product produced by quenching molten blast furnace slag in water.

Suitable organoelement polymers are, in particular, polymeric organic compounds of silicon, boron and/or phosphorus such as polysiloxanes, polysilazanes, polyphosphazenes and polyboronitrides. They can either be used as such (polyboronitrides) or be converted into thermally stable materials by heat treatment (e.g. polysilazanes).

Suitable finely divided inorganic solids are, in particular, thermally stable binary compounds such as silicon dioxide, silicon nitride, aluminum oxide, titanium dioxide, titanium carbide, tungsten carbide and ternary compounds, in particular silicates such as zirconium silicate or titanates such as aluminum titanate, which are bound by inorganic compounds forming glass phases, e.g. mixed silicates.

The choice of suitable materials is restricted by the required heat resistance which should be at least 500° C. and the compatibility with the carbon fibers used for reinforcement. The matrix material has to be chosen so that no attack on the fibers which damages or destroys the carbon of the fibers occurs during formation of the ceramic microstructure.

The linings comprising fiber-reinforced ceramic materials are preferably affixed to a carrier made of metal or fiber-reinforced ceramic. Fastening can be effected by adhesive bonding, screwing, riveting or by means of other suitable joining techniques.

The mass fraction of the carbon reinforcing fibers in the ceramic material is preferably from 20% to 60%, particularly preferably from 25% to 50% and in particular from 30% to 35%. It is possible to use long fibers in the form of lay-ups, tapes (known as UD tapes, i.e. continuous parallel fibers in tape form), woven fabrics, knitted fabrics, mats, nonwovens and films; it is also possible and preferred to use short fibers. For the purposes of the present invention, long fibers are fibers having a weight average length of more than 30 mm, preferably more than 50 mm. The weight average length of the short carbon fibers is preferably from 0.001 mm to 30 mm, particularly preferably from 0.1 mm to 15 mm and in particular from 0.2 mm to 5 mm. The diameter of the short and long fibers is from 4 μm to 12 μm, preferably from 5 μm to 10 μm and in particular from 6 μm to 8 μm.

The linings comprising the fiber-reinforced ceramic material preferably have a thickness of from 2 to 6 mm and have the shape of rounded rectangles, rounded trapezoids or ring segments, with the dimension in the direction of the clutch disk radius preferably being from 10 mm to 30 mm and that in the circumferential direction preferably being from 10 mm to 90 mm. Preference is given to at least 2, more preferably at least 3 and particularly preferably at least 4, of these linings being arranged symmetrically around the circumference of the clutch disk.

The materials for the linings can be produced by a multi-stage process in which, in the case of the use of short fibers,
- in the first step, short carbon fibers are mixed with the starting materials for the future matrix, with or without addition of plastic thermally decomposable auxiliaries, these mixtures are
- in the second step, pressed with application of pressure and heat to form bodies whose dimensions correspond to the desired linings,
- the pressed bodies are, in the third step, converted into porous bodies interspersed by short carbon fibers with retention of their shape by heating in the absence of oxidizing agents and, if applicable, decomposition of the plastic auxiliaries, and these are
- in the fourth step, densified by application of pressure and heat and/or filling of the pores with a melt of a glass or a metal under reduced pressure, with the melt being selected so that no attack on the carbon of the reinforcing fibers occurs.

The metals or glasses used in the fourth step preferably have a melting point of at least 550° C., preferably at least 600° C. Apart from metals which meet this condition, e.g. aluminum, iron, chromium, nickel, molybdenum, tungsten, vanadium, niobium, tantalum, titanium and zirconium, particular preference is also given to alloys such as brass and bronze. The mass fraction of these metals in the matrix is preferably from 2% to 20%. The temperature employed in the fourth step for filling the pores with glasses or metals is selected so that no reaction or only an insignificant degree of reaction occurs between the glasses or the metals and the carbon of the fibers. For the present purposes, an insignificant degree means that less than 10% of the mass of the carbon of the fibers is consumed by chemical reaction with the metal or glass. It is also preferred that the pores are only partly filled in the fourth step and that subsequently in the fifth step the remaining pores are completely or partly filled with a metal selected from among aluminum, iron, chromium, nickel, molybdenum, tungsten, vanadium, niobium, tantalum, titanium and zirconium and the alloys brass and bronze, with the metal used in the fifth step being different from any metal used in the fourth step.

If long fibers are used, these are preferably laid in molds whose shape corresponds to the shape of the desired lining, the intermediate spaces between fibers are filled with the material forming the matrix and the molds which have been filled in this way are treated as set forth in steps 2 to 4 above.

If mounting holes are necessary for attaching the linings to the clutch disk, they can advantageously be introduced into the porous bodies obtained in the third step.

A preferred production variant for the materials according to the invention reinforced with short fibers utilizes a continuous process in which the mixture of the short fibers and the binder is produced in a mixer and is introduced into a continuous screw extruder and extruded through a die which corresponds to the shape of the desired linings. The extrudate is then cut up, and the blanks obtained are treated further as described above. As a result of this method of manufacture, the preferential orientation of the short carbon fibers is perpendicular to the friction surface of the linings, and this has been found to have a particularly favorable effect on the level of the static friction.

In the case of long or continuous fibers, preference is given to at least the friction surface not being made of UD tapes. Preference is given to using textiles made of continuous or long fibers in which at least 20% of the fiber segments are at an angle different from zero to the surface of the clutch lining. Here, curved fibers are divided geometrically in a known manner into segments having a uniform orientation in order to describe their orientation distribution.

The invention claimed is:

1. A clutch lining having a friction surface, said clutch lining consisting of fiber-reinforced ceramic materials which consist of short carbon fibers having a weight-average length of from 0.001 mm to 5 mm, an orientation perpendicular to said friction surface of the clutch lining, and a matrix material which fills the intermediate spaces between fibers, which said matrix material is selected from the group consisting of inorganic polymers having a main chain containing no carbon atoms and is made up of atoms selected from the group consisting of aluminum, boron, phosphorus, sulphur, silicon, nitrogen and tin, wherein the inorganic polymers are selected from the group consisting of poly(boronitrides), polyphosphates, polyphosphazenes, poly(siloxanes), poly(sulphazenes) and polysulphides.

2. A clutch lining as claimed in claim 1 which contains a mass fraction of carbon reinforcing fibers of from 20% to 60%.

3. A clutch lining having a friction surface, said clutch lining consisting of fiber-reinforced ceramic materials which consists of long carbon fibers having a weight-average length of more than 30 mm, wherein at least 20% of the fiber segments are at an angle different from zero to said friction surface of said clutch lining, and a matrix material which fills the intermediate spaces between fibers, which said matrix material is selected from the group consisting of inorganic polymers having a main chain, which main chain is made up of atoms selected from the group consisting of aluminum, boron, phosphorus, sulphur, silicon, nitrogen and tin wherein said long carbon fibers are used in the form of lay-ups, tapes, woven fabrics, knitted fabrics, mats, and nonwovens, and wherein the inorganic polymers are selected from the group consisting of poly(boronitrides), polyphosphates, polyphosphazenes, poly(siloxanes), poly(sulphazenes) and polysulphides.

* * * * *

UNITED STATES PATENT AND TRADEMARK OFFICE
CERTIFICATE OF CORRECTION

| | | |
|---|---|---|
| PATENT NO. | : 7,767,733 B2 | Page 1 of 1 |
| APPLICATION NO. | : 10/919960 | |
| DATED | : August 3, 2010 | |
| INVENTOR(S) | : Andreas Kienzle et al. | |

It is certified that error appears in the above-identified patent and that said Letters Patent is hereby corrected as shown below:

On the Title page of the patent:

In the left column (73) Assignee should read: ~~SGL Carbon AG~~ <u>Audi AG</u> (DE)

Signed and Sealed this
Fourteenth Day of June, 2011

David J. Kappos
*Director of the United States Patent and Trademark Office*